United States Patent [19]

Dixon

[11] Patent Number: 5,507,556
[45] Date of Patent: Apr. 16, 1996

[54] SEAT INCLUDING AN AUTOMATICALLY ADJUSTABLE DISPLAY SCREEN ASSEMBLY

[75] Inventor: Richard W. Dixon, Winston-Salem, N.C.

[73] Assignee: Burns Aerospace Corporation, Winston-Salem, N.C.

[21] Appl. No.: 334,134

[22] Filed: Nov. 4, 1994

[51] Int. Cl.$^6$ .......................................................... A47C 7/62
[52] U.S. Cl. .................................... 297/217.3; 297/188.04
[58] Field of Search ................................ 297/146, 217.3, 297/188.04, 188.07

[56] References Cited

U.S. PATENT DOCUMENTS

| | | | |
|---|---|---|---|
| 2,604,536 | 7/1952 | Rose | 178/7.5 |
| 3,795,422 | 3/1974 | Robinson et al. | 297/146 |
| 3,813,147 | 5/1974 | Rick | 297/146 |
| 4,141,586 | 2/1979 | Goldner et al. | 297/167 |
| 4,372,515 | 2/1983 | Noonan | 248/178 |
| 4,584,603 | 4/1986 | Harrison | 297/217.3 |
| 4,756,528 | 7/1988 | Umashankar | 273/1 E |
| 4,813,743 | 3/1989 | Mizelle | 297/357 |
| 5,179,447 | 1/1993 | Lain | 358/254 |
| 5,267,775 | 12/1993 | Nguyen | 297/217 |

*Primary Examiner*—Peter M. Cuomo
*Assistant Examiner*—Anthony D. Barfield
*Attorney, Agent, or Firm*—W. Thad. Adams, III

[57] ABSTRACT

An improved seat includes a seat bottom and adjustable seat back. The seat back is movable between an upright position and a reclined position. The improvement in the seat includes an adjustable display screen assembly mounted on a back side of the seat back. The display screen assembly defines on one side thereof a display screen surface for being viewed by a viewer located behind the seat. A pivot bolt is associated with the display screen assembly for allowing pivoting movement of the display screen assembly relative to the seat back. A control cable assembly automatically controls the pivoting movement of the display screen assembly in coordination with the movement of the seat back. The control cable assembly operates to maintain the display screen assembly at a predetermined viewing angle relative to the viewer as the seat back moves between the upright and reclined positions.

14 Claims, 5 Drawing Sheets

SEAT INCLUDING AN AUTOMATICALLY ADJUSTABLE DISPLAY SCREEN ASSEMBLY

TECHNICAL FIELD AND BACKGROUND OF THE INVENTION

This invention relates to an improved seat including an automatically adjustable display screen assembly. The invention is most applicable to aircraft seats, but may also have utility in other passenger vehicles, such as RVs, minivans, and the like.

Typical seats of the prior art, as commonly found in airplanes for example, include an adjustable seat back which is movable between an upright position and a reclined position. These seats are generally closely spaced, and arranged in any number of rows and columns depending upon the particular flight class and the size of the aircraft. To further the enjoyment of the flight, a display screen is sometimes located on the back side of the seat back to be viewed by a viewer in an identical seat located behind the screen. The display screen may be used for movies, video games, or provide other services such as flight information or in-flight telephone service.

Since the seat in front of the viewer is relatively closely spaced to the viewer, the screen becomes difficult and awkward to view when the front passenger moves his seat. While some display screens provide for a limited range of manual adjustment, others do not. For those screens which do not adjust, the display screen is generally useless to the viewer when the front passenger moves his seat to a fully reclined position. In the case of manually adjustable screens, many viewers quickly become frustrated with a front passenger who frequently moves his seat between the upright and reclined position.

The present invention overcomes these and other problems of the prior art by providing a seat which includes an automatically adjustable display screen assembly. The invention responds automatically to the movement of the seat to pivot the display screen and maintain the display screen at a predetermined viewing angle relative to the viewer in the back seat.

SUMMARY OF THE INVENTION

Therefore, it is an object of the invention to provide an improved seat which includes an automatically adjustable display screen assembly.

It is another object of the invention to provide an improved seat with an automatically adjustable display screen assembly which is relatively easy to install and maintain.

It is another object of the invention to provide an improved seat with an automatically adjustable display screen assembly which is relatively inexpensive.

These and other objects of the present invention are achieved in the preferred embodiments disclosed below by providing an improved seat having a seat bottom and adjustable seat back. The seat back is movable between an upright position and a reclined position. The improvement in the seat includes an adjustable display screen assembly mounted on a back side of the seat back. The display screen assembly defines on one side thereof a display screen surface for being viewed by a viewer located behind the seat. Pivot means are associated with the display screen assembly for allowing pivoting movement of the display screen assembly relative to the seat back. Control means automatically controls the pivoting movement of the display screen assembly in coordination with the movement of the seat back. The control means operates to maintain the display screen assembly at a predetermined viewing angle relative to the viewer as the seat back moves between the upright and reclined positions.

According to one preferred embodiment of the invention, the control means includes a control cable assembly extending downwardly from the display screen assembly to the seat bottom. The control cable assembly includes a cable having first and second ends. The first end is connected to the display screen assembly and the second end is connected to the seat bottom.

According to another preferred embodiment of the invention, the control cable assembly further includes a slip sheath having first and second openings through which the respective ends of the cable extend. The cable moves within the sheath in response to the movement of the seat back.

According to yet another preferred embodiment of the invention, the back side of the seat back defines a recess therein for receiving the display screen assembly.

According to yet another preferred embodiment of the invention, the display screen assembly includes a mounting plate positioned in the recess of the seat back for mounting the display screen assembly to the seat back.

According to yet another preferred embodiment of the invention, the mounting plate includes first and second spaced-apart flanges each defining an opening therein for receiving the pivot means.

According to yet another preferred embodiment of the invention, the pivot means includes at least one pivot bolt extending through each of the first and second flange openings and connecting to the seat back. The pivot bolts allow pivoting movement of the display screen assembly in coordination with the movement of the seat back.

According to yet another preferred embodiment of the invention, the control means further includes a spring attached to an upper end of the mounting plate. The spring extends downwardly below the upper end of the mounting plate to a connecting point located in an open area adjacent to the recess. The spring cooperates with the at least one pivot bolt to urge the lower end of the mounting plate outwardly away from the seat back.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
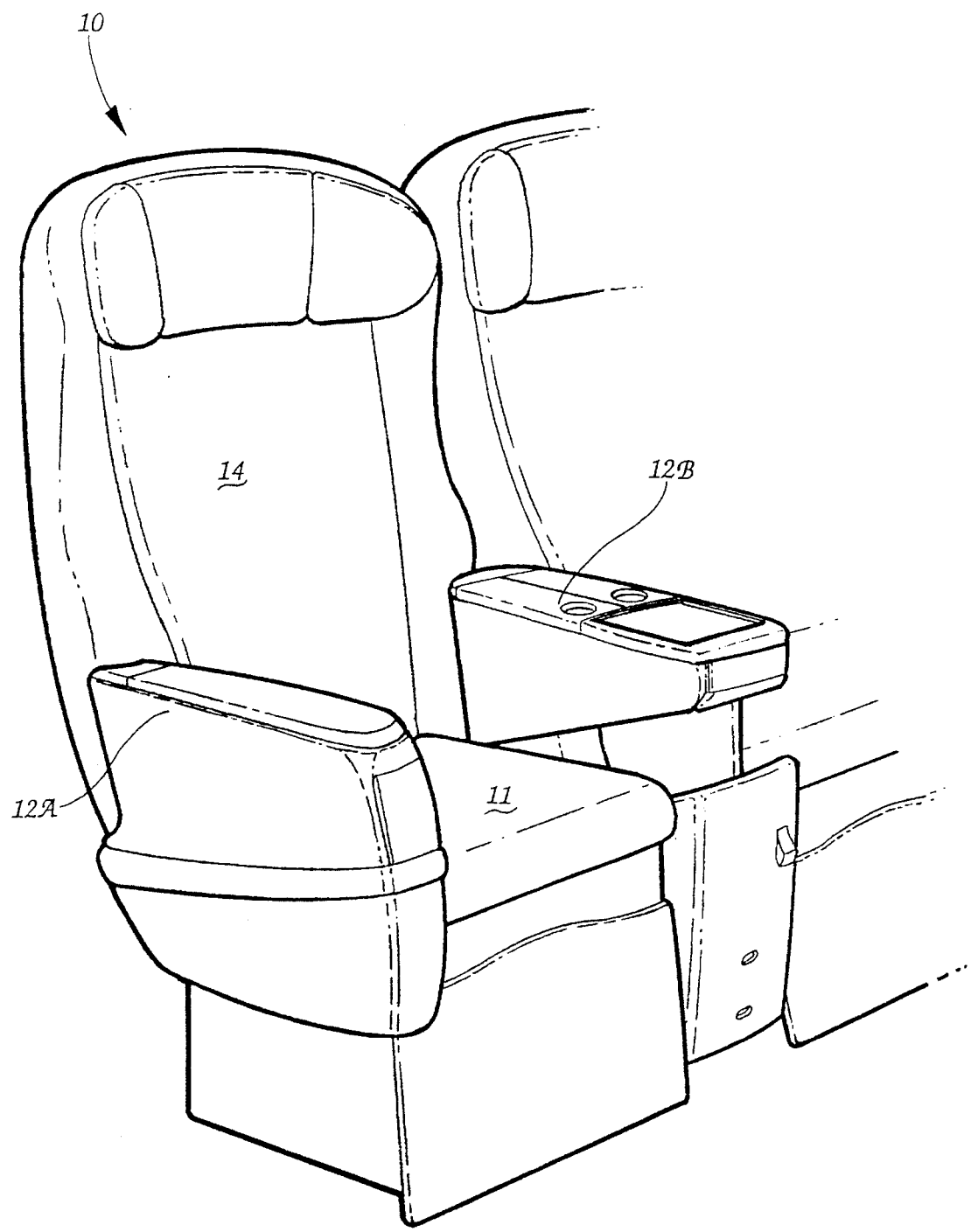
FIG. 1 is a front perspective view of the improved seat according to a preferred embodiment of the invention.

Referring now specifically to the drawings, an improved seat according to the present invention is illustrated in FIG.

1 and shown generally at reference numeral 10. The seat 10 includes a seat bottom 11, arm rests 12A and 12B, and an adjustable seat back 14. The seat back 14 is movable between an upright position and a reclined position. The seat 10 is of a particular type used in passenger vehicles, such as airplanes, automobiles, mini-vans, and the like. Alternatively, the seat 10 may be used in other settings, such as theaters and auditoriums.

Figure 2:
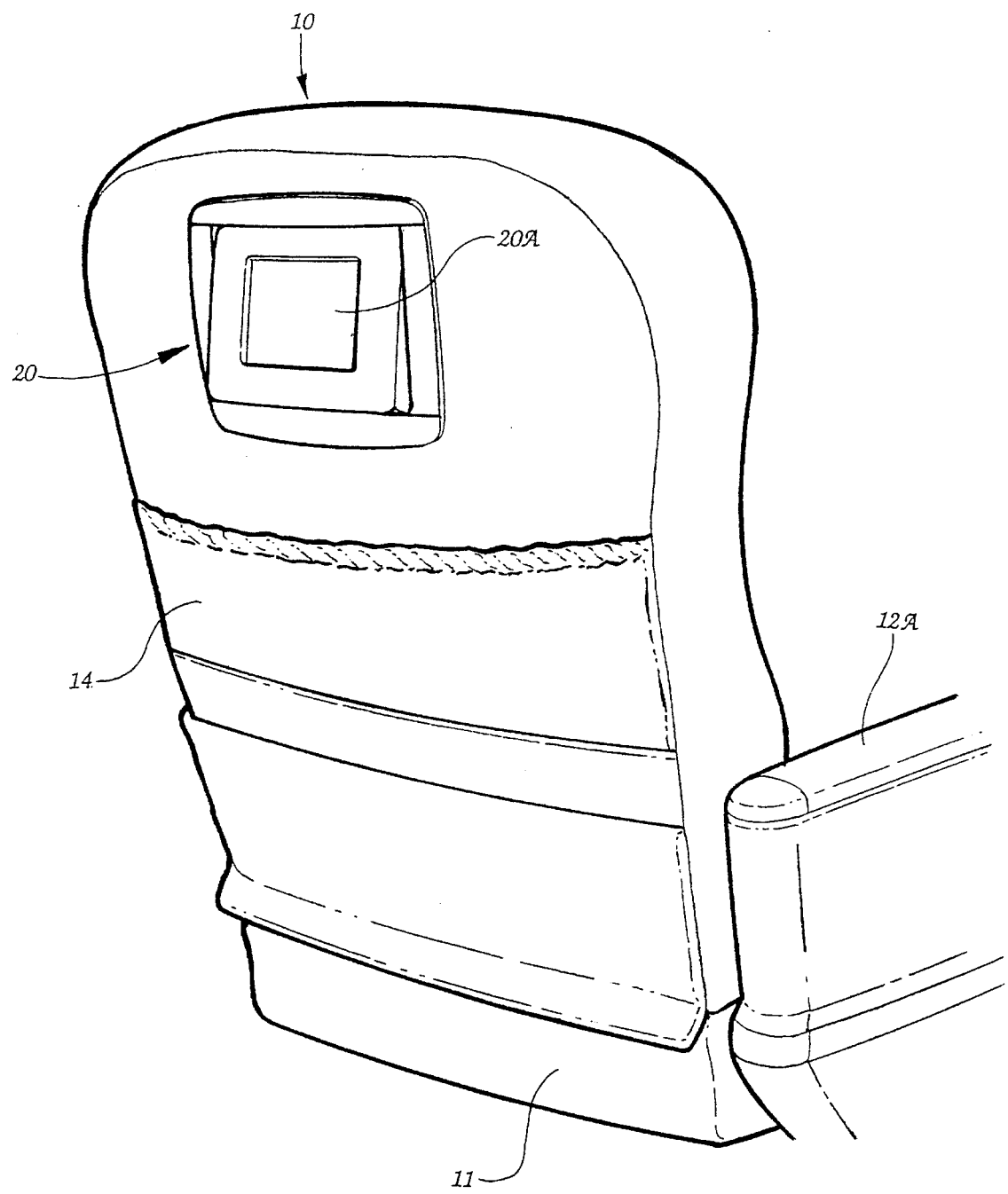
FIG. 2 is a fragmentary, back perspective view of the improved seat as shown in FIG. 1.

As shown in FIG. 2, the seat 10 includes an automatically adjustable display screen assembly 20 mounted on a back side of the seat back 14. The display screen assembly 20 includes a display screen surface 20A, such as an LCD screen, for being viewed by a viewer located behind the seat 10. In a typical case, the viewer is located in a viewing position in a seat identical to the seat 10. As the seat 10 moves from the upright position to the reclined position and vice-versa, the display screen assembly 20 automatically pivots to maintain a constant, predetermined viewing angle relative to the viewer.

Figure 3:
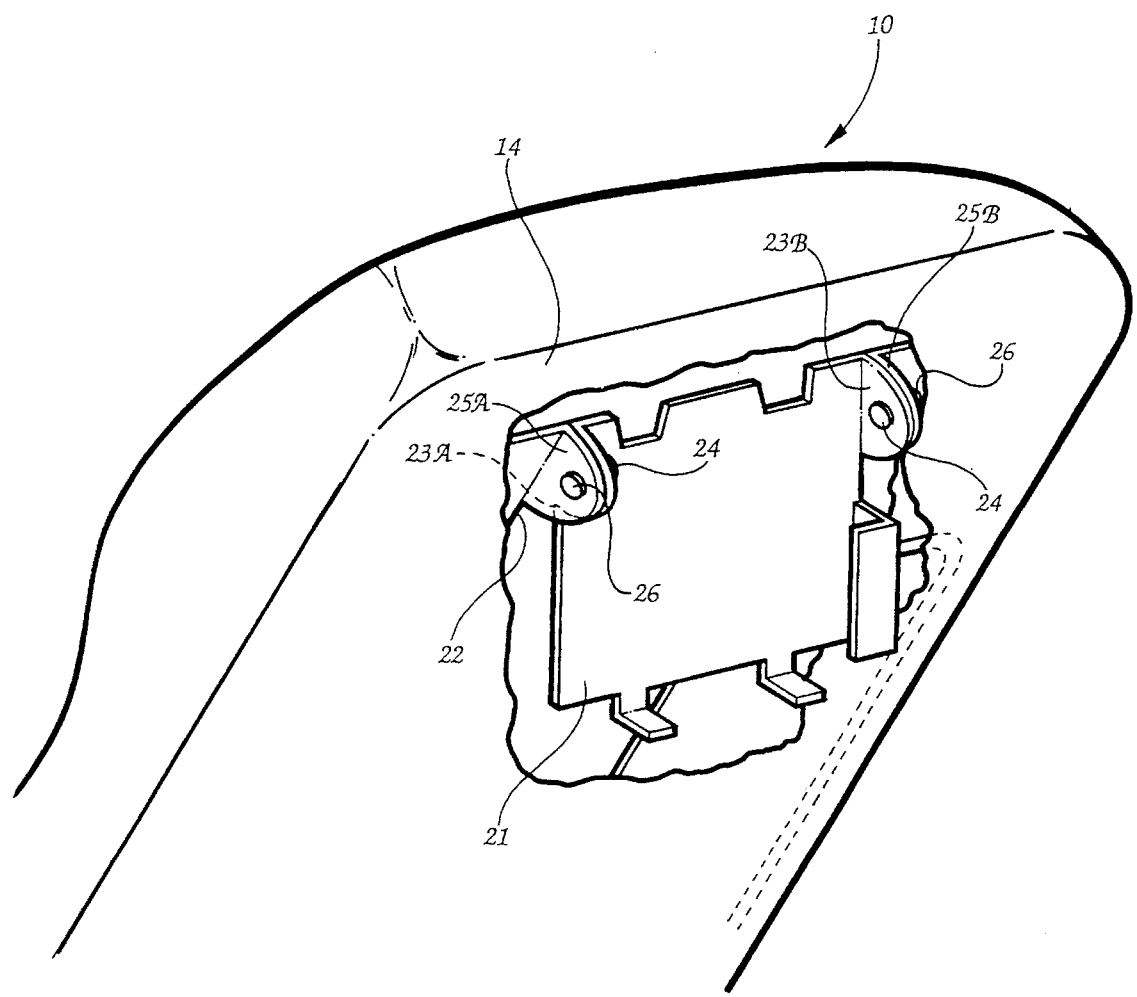
FIG. 3 is a fragmentary, back perspective view of the seat showing a portion of the seat broken away with the display screen assembly removed to illustrate the mounting plate.
Figure 4:
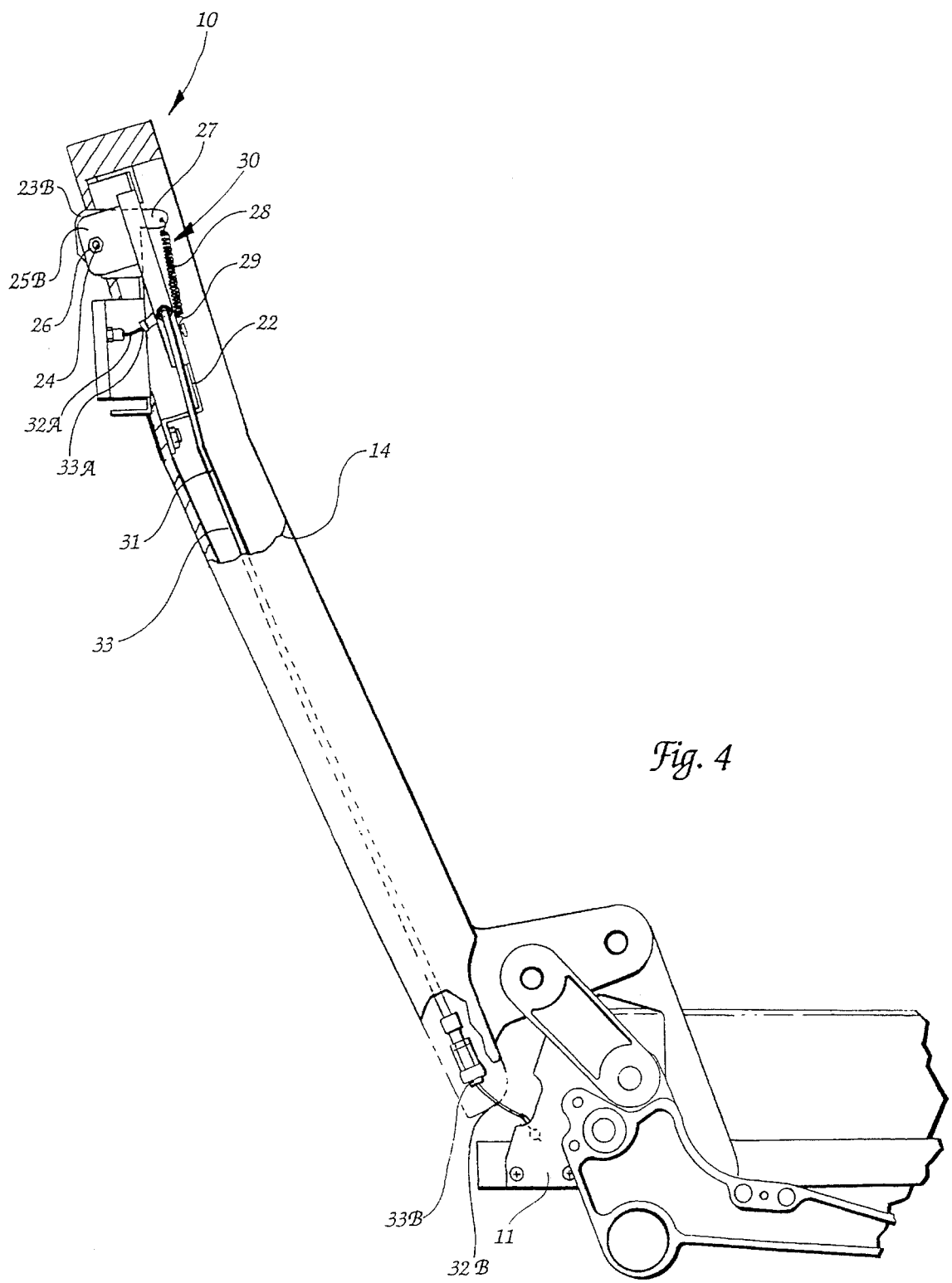
FIG. 4 is a fragmentary, side cross-sectional view of the improved seat with seat cushions removed, and showing the seat back in an upright position.
Figure 5:
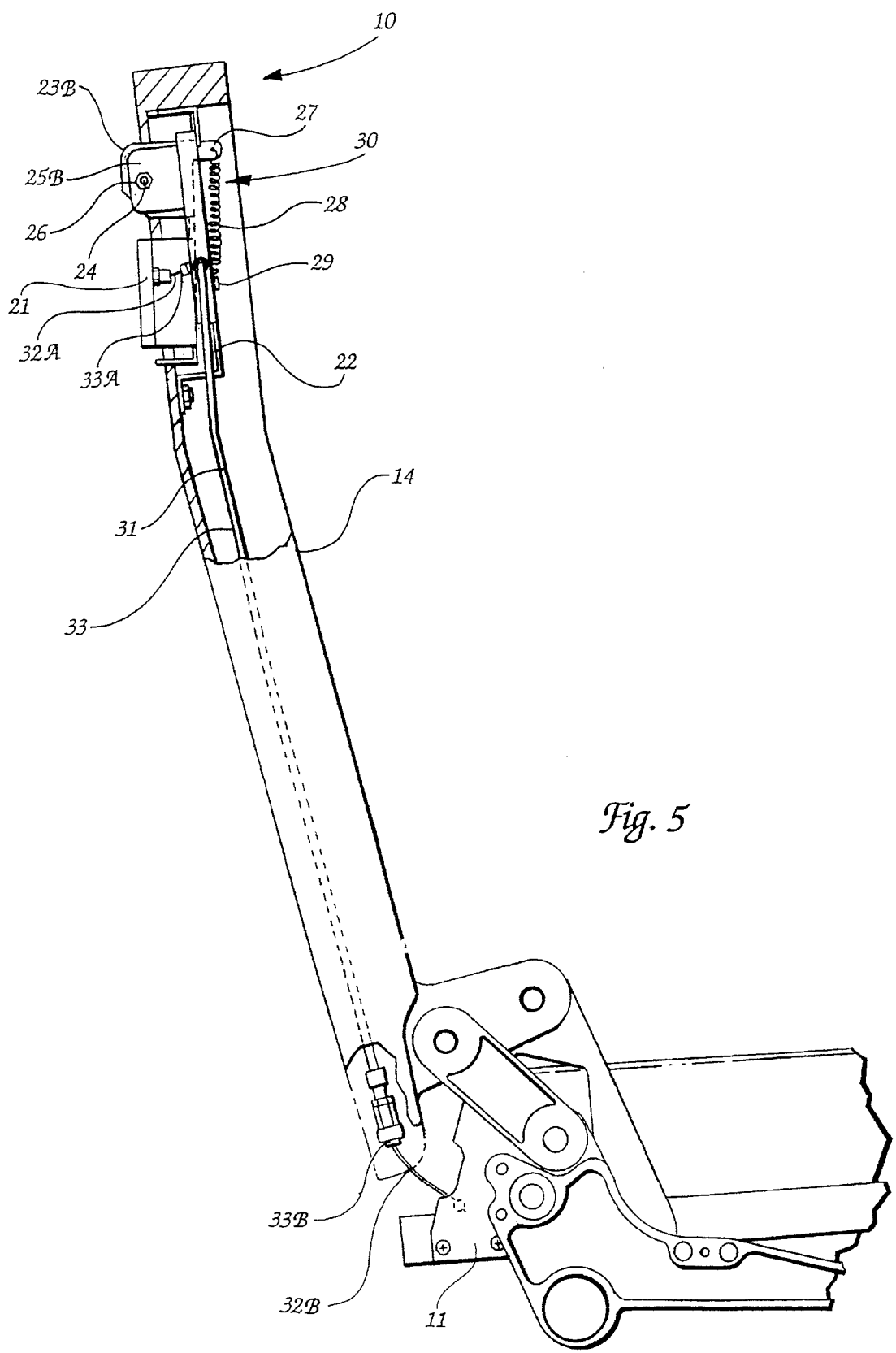
FIG. 5 is a fragmentary, side cross-sectional view of the improved seat with seat cushions removed, and showing the seat back of the seat in a reclined position.

Referring to FIGS. 3–5, the display screen assembly 20 is pivotably attached to a back side of the seat back 14 by a mounting plate 21. A recess 22 is formed in the seat back 14 for receiving the mounting plate 21. The display screen assembly 20 is therefore recessed into the seat back 14 and allows easy ingress and egress of the viewer as he moves to and from his seat.

As best shown in FIG. 3, the mounting plate 21 includes outwardly-extending, opposing flanges 23A and 23B located on an upper end of the mounting plate 21. Each flange 23A, 23B includes an opening therein for receiving a threaded pivot bolt 24. The pivot bolts 24 extend through the respective flange openings and through side plates 25A and 25B extending outwardly from the recess 22 of the seat back 14. Preferably, each bolt 24 includes an internally-threaded nut 26. The nuts 26 do not interfere with the pivoting movement of the mounting plate 21 about the pivot bolts 24.

As shown in FIGS. 4 and 5, the mounting plate 21 further includes an inwardly-extending arm 27 formed on the upper end of the mounting plate 21 opposite the flange 23B. The arm 27 has an opening therein for receiving one end of a spring 28. The opposite end of the spring 28 is attached to a connecting point 29 located in an open area 30 between the recess 22 and front side of the seat back 14. The spring 28 applies a downward force on the mounting plate arm 27, and cooperates with the pivot bolts 24 to normally urge the lower end of the mounting plate 21 outwardly away from the seat back 14 and the upper end of the mounting plate 21 inwardly into the open area 30 of the seat back 14.

A control cable assembly 31 extends from the mounting plate 21 downwardly within the seat back 14 to the seat bottom 11. The control cable assembly 31 preferably includes a metal cable 32 and slip sheath 33. A first end 32A of the metal cable 32 is secured to the mounting plate 21, while the second end 32B is secured to the seat bottom 11. The metal cable 32 slides within the sheath 33 in response to the movement of the seat back 14. The sheath 33 is secured at opposite ends thereof to the seat back 14, and includes first and second openings 33A and 33B through which the first and second ends 32A, 32B of the cable 32 extend.

FIGS. 4 and 5 illustrate the automatic adjustment of the display screen assembly 20 as the seat back 14 moves from the reclined position to the upright position. As shown in FIG. 4, the seat back 14 is in the reclined position with the spring 28 urging the lower end of the mounting plate 21 outwardly, as described above. In this position, the display screen assembly 20 is at a proper, predetermined viewing angle relative to a viewer located behind the seat 10.

As the seat back 14 moves to the upright position shown in FIG. 5, the viewing angle must adjust gradually in coordination with this movement to maintain the proper viewing angle. To achieve this, the cable 32 of the control cable assembly 31 slides within the sheath 33 in response to the movement of the seat back 14, and operates to pull the lower end of the mounting plate 21 inwardly against the force of the spring 28. Thus, the first end 32A of the cable 32 connected to the mounting plate 21 gradually becomes shorter in relation to the first opening 33A of the sheath 33, while the second end 32B of the cable 32 connected to the seat bottom 11 gradually becomes longer in relation to the second opening 33B of the sheath 33.

When the seat back 14 has reached the full upright position, the display screen assembly 20 is located substantially within the recess 22 of the seat back 14, and is held by the control cable assembly 31 at a proper viewing angle relative to the viewer. The control cable assembly 31 maintains the spring 28 in a tensioned condition. As the seat back 14 returns to the reclined position, the spring 28 cooperates with the pivot bolts 24 to gradually pivot the lower end of the mounting plate 21 outwardly to adjust the viewing angle in coordination with the movement. The first end 32A of the cable 32 becomes longer, while the second end 32B becomes shorter. Thus, the display screen assembly 20 is automatically maintained at a proper viewing angle relative to the viewer throughout the entire movement of the seat back 14 between the reclined and upright positions.

A seat including an automatically adjustable display screen assembly is described above. Various details of the invention may be changed without departing from its scope. Furthermore, the foregoing description of the preferred embodiment of the invention is provided for the purpose of illustration only and not for the purpose of limitation—the invention being defined by the claims.

I claim:

1. In combination with a seat having a seat bottom and adjustable seat back, the seat back being movable between an upright position and a reclined position, the improvement comprising:

(a) an adjustable display screen assembly mounted on a back side of the seat back, and defining on one side thereof a display screen surface for being viewed by a viewer located behind the seat;

(b) pivot means interconnecting said display screen assembly and said seat back for allowing pivoting movement of said display screen assembly relative to the seat back; and (c) control means responsive to movement of the seat back for controlling the pivoting movement of said display screen assembly in coordination with the movement of said seat back to thereby maintain the display screen assembly at a predetermined viewing angle relative to the viewer as the seat back moves between the upright and reclined positions, said control means comprising a control cable assembly extending downwardly from the display screen assembly to the seat bottom, said control cable assembly including a cable having first and second ends, the first end being connected to the display screen assembly and the second end being non-pivotally connected to the seat bottom.

2. An improved seat according to claim 1, wherein said control cable assembly further includes a slip sheath having first and second openings through which the respective ends of the cable extend, the cable moving within said sheath in response to the movement of said seat back.

3. An improved seat according to claim 1, wherein a back side of the seat back defines a recess therein for receiving the display screen assembly.

4. An improved seat according to claim 3, wherein said display screen assembly includes a mounting plate positioned in the recess of the seat back for mounting said display screen assembly to the seat back.

5. An improved seat according to claim 4, wherein said mounting plate includes first and second spaced-apart flanges each defining an opening therein for receiving said pivot means.

6. An improved seat according to claim 5, wherein said pivot means comprises at least one pivot bolt extending through each of the first and second flange openings and connecting to the seat back for allowing pivoting movement of the display screen assembly in coordination with the movement of the seat back.

7. An improved seat according to claim 6, wherein said control means includes a spring attached to an upper end of the mounting plate, said spring extending downwardly below the upper end of the mounting plate to a connecting point located in an open area adjacent to the recess, said spring cooperating with said at least one pivot bolt to urge a lower end of said mounting plate outwardly away from the seat back.

8. In combination with a seat having a seat bottom and adjustable seat back, the seat back being movable between an upright position and a reclined position, the improvement comprising:

(a) an adjustable display screen assembly mounted on a back side of the seat back, and defining on one side thereof a display screen surface for being viewed by a viewer located behind the seat;

(b) pivot means associated with said display screen assembly for allowing pivoting movement of said display screen assembly relative to the seat back;

(c) a control cable assembly extending downwardly from the display screen assembly to the seat bottom, and including a cable having first and second ends, the first end being connected to the display screen assembly and the second end being non-pivotally connected to the seat bottom; and (d) said control cable assembly further including a slip sheath having first and second openings through which the respective ends of the cable extend, the cable moving within said sheath in response to the movement of said seat back, whereby the display screen assembly is maintained at a predetermined viewing angle relative to the viewer as the seat back moves between the upright and reclined positions.

9. An improved seat according to claim 8, wherein a back side of the seat back defines a recess therein for receiving the display screen assembly.

10. An improved seat according to claim 9, wherein said display screen assembly includes a mounting plate positioned in the recess of the seat back for mounting said display screen assembly to the seat back.

11. An improved seat according to claim 10, wherein said mounting plate includes first and second spaced-apart flanges each defining an opening therein for receiving said pivot means.

12. An improved seat according to claim 11, wherein said pivot means comprises at least one pivot bolt extending through each of the first and second flange openings and connecting to the seat back for allowing pivoting movement of the display screen assembly in coordination with the movement of the seat back.

13. An improved seat according to claim 12, wherein said control means includes a spring attached to an upper end of the mounting plate, said spring extending downwardly below the upper end of the mounting plate to a connecting point located in an open area adjacent to the recess, said spring cooperating with said at least one pivot bolt to urge a lower end of said mounting plate outwardly away from the seat back.

14. In combination with a seat having a stationary seat bottom and adjustable seat back, the seat back being movable between an upright position and a reclined position, the improvement comprising:

(a) an adjustable display screen assembly mounted on a back side of the seat back, and defining on one side thereof a display screen surface for being viewed by a viewer located behind the seat;

(b) pivot means interconnecting said display screen assembly and said seat back for allowing pivoting movement of said display screen assembly relative to the seat back; and (c) control means responsive to movement of the seat back for controlling the pivoting movement of said display screen assembly in coordination with the movement of said seat back to thereby maintain the display screen assembly at a predetermined viewing angle relative to the viewer as the seat back moves between the upright and reclined positions, said control means comprising a control cable assembly extending downwardly from the display screen assembly to the seat bottom, said control cable assembly including a cable having first and second ends, the first end being connected to the display screen assembly and the second end being fixed to the stationary seat bottom for transmitting relative movement between the stationary seat bottom and the moveable seat back to the display screen assembly.

* * * * *